US012598422B2

(12) United States Patent
Qiu

(10) Patent No.: US 12,598,422 B2
(45) Date of Patent: Apr. 7, 2026

(54) KALMAN-FILTER-BASED ADAPTIVE MICROPHONE ARRAY NOISE REDUCTION METHOD AND APPARATUS

(71) Applicant: YEALINK (XIAMEN) NETWORK TECHNOLOGY CO., LTD., Xiamen (CN)

(72) Inventor: Zhihao Qiu, Xiamen (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 192 days.

(21) Appl. No.: 18/698,082

(22) PCT Filed: Mar. 13, 2024

(86) PCT No.: PCT/CN2024/081338
§ 371 (c)(1),
(2) Date: Apr. 3, 2024

(87) PCT Pub. No.: WO2024/198931
PCT Pub. Date: Oct. 3, 2024

(65) Prior Publication Data
US 2025/0240565 A1 Jul. 24, 2025

(30) Foreign Application Priority Data
Mar. 27, 2023 (CN) ........................ 202310304623.7

(51) Int. Cl.
*G10L 21/0216* (2013.01)
*G10L 21/0224* (2013.01)
(Continued)

(52) U.S. Cl.
CPC ............ *H04R 3/04* (2013.01); *G10L 21/0224* (2013.01); *G10L 2021/02082* (2013.01); *G10L 2021/02166* (2013.01); *H04R 2460/01* (2013.01)

(58) Field of Classification Search
CPC ............. G10L 21/0224; G10L 21/0208; G10L 2021/02082; G10L 2021/02166; H04R 3/04; H04R 2460/01; G10K 2210/3028
See application file for complete search history.

(56) References Cited

U.S. PATENT DOCUMENTS

2021/0176558 A1* 6/2021 Li ........................ H04R 1/1083

OTHER PUBLICATIONS

Hansler, Eberhard, and Gerhard Schmidt. Acoustic Echo and Noise Control: A Practical Approach—Chapter 7 Algorithms for Adaptive Filters. John Wiley & Sons, Inc., 2004, pp. 73-125. (Year: 2004).*

* cited by examiner

*Primary Examiner* — James K Mooney

(57) ABSTRACT

The present application discloses a Kalman-filter-based adaptive microphone array noise reduction method and apparatus. The method includes: acquiring an input signal at each time instance; establishing a superdirective filter model and using it to filter the input signal thereby generating a first reference signal for each time instance; establishing a beamforming filter model and using it to filter the input signal thereby generating a second reference signal for each time instance; establishing a Kalman filter model as well as a process equation and a measurement equation for each time instance; generating a Kalman gain for each time instance based on errors corresponding to the process equation and measurement equation to allow the Kalman filter model, based on the Kalman gain, to eliminate the interfering noise
(Continued)

from the first reference signal and the second reference signal and to generate a final output signal for each time instance.

10 Claims, 2 Drawing Sheets

(51) Int. Cl.
*H04R 3/04* (2006.01)
*G10L 21/0208* (2013.01)

KALMAN-FILTER-BASED ADAPTIVE MICROPHONE ARRAY NOISE REDUCTION METHOD AND APPARATUS

FIELD OF THE INVENTION

The present application relates to the field of speech enhancement, particularly to a Kalman-filter-based adaptive microphone array noise reduction method and apparatus.

BACKGROUND OF THE INVENTION

In common open-office scenarios, when people are making calls with headphones, background noises such as keyboard typing, tapping, and other voices can significantly affect the call quality. Especially, when there are other interfering voices around the headphone user, the call quality will be significantly affected. Therefore, reducing external background noise and interfering voices, i.e., reducing interference noise, and enhancing the call quality for headphone users is a pressing issue.

SUMMARY OF THE INVENTION

Embodiments of the present application provide a Kalman-filter-based adaptive microphone array noise reduction method and apparatus, which can enhance the purity of voice calls.

An embodiment of the present application provides a Kalman-filter-based adaptive microphone array noise reduction method, including:

acquiring an input signal at each time instance; wherein the input signal at each time instance contains target speech and interfering noise;

establishing a superdirective filter model, and then filtering the input signal for each time instance based on the superdirective filter model to generate a first reference signal for each time instance;

establishing a beamforming filter model, and then filtering the input signal for each time instance based on the beamforming filter model to generate a second reference signal for each time instance;

establishing a Kalman filter model as well as a process equation and a measurement equation corresponding to the Kalman filter model for each time instance; generating a Kalman gain for each time instance based on an error corresponding to the process equation and an error corresponding to the measurement equation at each time instance to allow the Kalman filter model, based on the Kalman gain at each time instance, to eliminate the interfering noise from the first reference signal and the second reference signal for each time instance and to generate a final output signal for each time instance.

Furthermore, the process of establishing a superdirective filter model, and then filtering the input signal for each time instance based on the superdirective filter model to generate a first reference signal for each time instance includes:

for the input signal at each time instance, generating a corresponding relative transfer function and a pseudo-coherence matrix based on the input signal, establishing the superdirective filter model based on the relative transfer function and pseudo-coherence matrix of the input signal, and filtering the input signal for each time instance based on the superdirective filter model to generate the corresponding first reference signal.

Furthermore, the process of establishing a beamforming filter model, and then filtering the input signal for each time instance based on the beamforming filter model to generate a second reference signal for each time instance includes:

performing nullspace projection on the beamforming filter model to generate a corresponding blocking matrix;

filtering the input signal for each time instance based on the blocking matrix to generate a second reference signal for each time instance.

Furthermore, the process of establishing a process equation corresponding to the Kalman filter model for each time instance includes:

establishing the process equation corresponding to the Kalman filter model for each time instance through the following formula:

$$w_{sc}(l) = A^{H}(l)w_{sc}(l-1) + \triangle w(l)$$

where $w_{sc}(l)$ represents a sidelobe cancellation filter model in the Kalman filter model at time instance l, A represents a state equation, H represents a conjugate transpose symbol, and $\Delta w(l)$ represents the error of the process equation at time instance l.

Furthermore, the process of establishing a measurement equation corresponding to the Kalman filter model for each time instance includes:

establishing the measurement equation corresponding to the Kalman filter model for each time instance based on the first reference signal and the second reference signal at each time instance; wherein, the process equation corresponding to the Kalman filter model is established for each time instance through the following formula:

$$x_{bf}(l) = x_{bm}{}^{H}(l)w_{sc}(l) + \triangle s(l)$$

where $x_{bf}(l)$ represents the first reference signal at time instance l, $x_{bm}{}^{H}(l)$ represents a conjugate transpose matrix of the second reference signal at time instance l, H represents the conjugate transpose symbol, and $\Delta s(l)$ represents the error of the measurement equation at time instance l.

Furthermore, the Kalman gain at each time instance is generated based on the error corresponding to the process equation and the error corresponding to the measurement equation at each time instance, and this process includes:

generating an error covariance matrix of the process equation for each time instance based on the error corresponding to the process equation at the corresponding time instance;

generating an error covariance matrix of the measurement equation for each time instance based on the error corresponding to the measurement equation at the corresponding time instance;

generating a Kalman gain of the Kalman filter for each time instance based on the error covariance matrix of the process equation and the error covariance matrix of the measurement equation at each time instance.

Furthermore, the process, in which the Kalman filter model, based on the Kalman gain at each time instance, eliminates the interfering noise from the first reference signal and the second reference signal for each time instance includes:

eliminating a noise field of the interfering noise from the first reference signal and the second reference signal for each time instance through the Kalman gain at each time instance; wherein for each time instance, the interfering noise is estimated by a process including:

when the Kalman gain approximates to zero, the eliminated noise field of the interfering noise is estimated as a noise field filtered out by the sidelobe cancellation filter model in the process equation;

when the Kalman gain approximates to one, the eliminated noise field of the interfering noise is estimated as a noise field estimated by the measurement equation.

Furthermore, the process of generating a final output signal for each time instance includes:

generating the final output signal for each time instance through the following formula:

$$e(l) = x_{bf}(l) - x_{bm}^{H}(l)w_{sc}(l)$$

where e(l) represents the final output signal at time instance l.

Furthermore, after the process of acquiring an input signal at each time instance, the method further includes:

applying a time-domain deconvolution method to perform dereverberation on the acquired input signal for each time instance.

In addition to the above method embodiment, the present application provides an apparatus embodiment correspondingly.

An embodiment of the present application provides correspondingly a Kalman-filter-based adaptive microphone array noise reduction apparatus, including: a signal requiring module, a first reference signal generating module, a second reference signal generating module, and a signal outputting module; wherein the signal requiring module is configured to acquire an input signal at each time instance; wherein the input signal at each time instance contains target speech and interfering noise;

the first reference signal generating module is configured to establish a superdirective filter model, and then filter the input signal for each time instance based on the superdirective filter model to generate a first reference signal for each time instance;

the second reference signal generating module is configured to establish a beamforming filter model, and then filter the input signal for each time instance based on the beamforming filter model to generate a second reference signal for each time instance;

the signal outputting module is configured to establish a Kalman filter model as well as a process equation and a measurement equation corresponding to the Kalman filter model for each time instance; generate a Kalman gain for each time instance based on an error corresponding to the process equation and an error corresponding to the measurement equation at each time instance to allow the Kalman filter model, based on the Kalman gain at each time instance, to eliminate the interfering noise from the first reference signal and the second reference signal for each time instance and to generate a final output signal for each time instance.

By implementing the present application, the following beneficial effects are achieved.

The present application provides a Kalman-filter-based adaptive microphone array noise reduction method and apparatus. The method acquires the input signal at each time instance, wherein the input signal at each time instance contains target speech and interfering noise; establishes the superdirective filter model, and then filters the input signal for each time instance based on the superdirective filter model to generate the first reference signal for each time instance; establishes the beamforming filter model, and then filters the input signal for each time instance based on the beamforming filter model to generate the second reference signal for each time instance; establishes the Kalman filter model as well as the process equation and the measurement equation corresponding to the Kalman filter model for each time instance; generates the Kalman gain for each time instance based on the error corresponding to the process equation and the error corresponding to the measurement equation at each time instance to allow the Kalman filter model, based on the Kalman gain at each time instance, to eliminate the interfering noise from the first reference signal and the second reference signal for each time instance and to generate the final output signal for each time instance. In this method, the input signal is acquired through a microphone array, and two rounds of filtering are applied to the input signal to obtain corresponding reference signals. Finally, by establishing the process equation and measurement equation in the Kalman filter, the interfering noise in the reference signals is estimated and the Kalman gain corresponding to the Kalman filter is generated. Based on the value of the Kalman gain, the interfering noise in the reference signals is eliminated and the final output signal is obtained. The method thereby enhances the speech purity for headphone users, improving the overall call quality.

DETAILED DESCRIPTION OF THE INVENTION

Below, in conjunction with the drawings in the embodiments of the present application, a clear and comprehensive description of the technical solutions in the embodiments of the present application will be provided. Clearly, the described embodiments are only a portion of the embodiments of the present invention, not all of the embodiments. Based on the embodiments of the present application, all other embodiments obtained by those skilled in the art without creative effort fall within the scope of protection of the present application.

Figure 1:
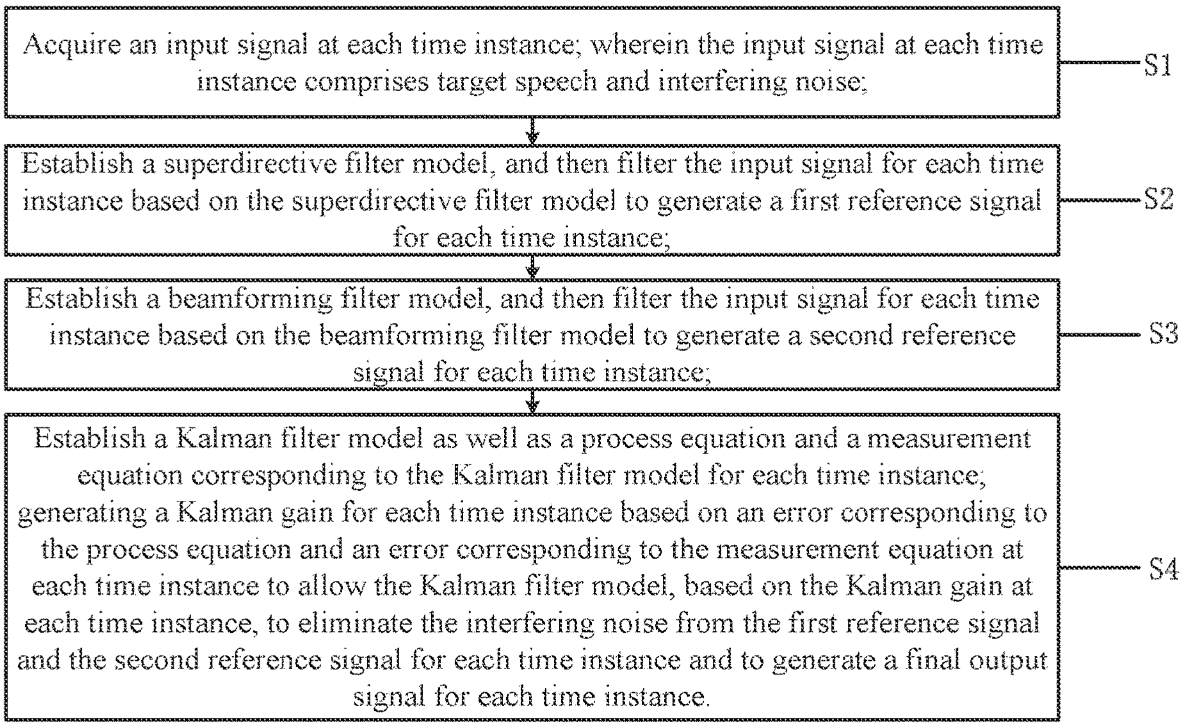
FIG. 1 is a schematic flowchart diagram illustrating a Kalman-filter-based adaptive microphone array noise reduction method according to an embodiment of the present application.

As shown in FIG. 1, an embodiment of the present application provides a Kalman-filter-based adaptive microphone array noise reduction method, including:

Step S1, acquiring an input signal at each time instance; wherein the input signal at each time instance contains target speech and interfering noise;

Step 2, establishing a superdirective filter model, and then filtering the input signal for each time instance based on the superdirective filter model to generate a first reference signal for each time instance;

Step 3, establishing a beamforming filter model, and then filtering the input signal for each time instance based on the beamforming filter model to generate a second reference signal for each time instance;

Step 4, establishing a Kalman filter model as well as a process equation and a measurement equation corresponding to the Kalman filter model for each time instance; generating a Kalman gain for each time instance based on an error corresponding to the process equation and an error corresponding to the measurement equation at each time instance to allow the Kalman filter model, based on the Kalman gain at each time instance, to eliminate the interfering noise from the first reference signal and the second reference signal for each time instance and to generate a final output signal for each time instance.

As to Step 1, to be more specific, the input signal at each time instance is acquired through a microphone array. The acquired input signal is a mixed signal containing both target speech and external interfering noise. The microphone array includes a plurality of microphones used for acquiring the input signal, meaning the microphone array is composed of a plurality of microphones. For example, if the current microphone array is composed of two microphones, a dual-channel mixed signal obtained by the dual-microphone headphone can be represented as follows:

$$x(t) = [x_1(t), x_2(t)]^T$$

where x(t) represents the input signal captured by the dual-microphone headphone, $x_1(t)$ represents the first input signal captured by the dual-microphone headphone, $x_2$ (t) represents the second input signal captured by the dual-microphone headphone, and $T_{is}$ a transpose symbol.

The obtained input signal from the dual-microphone headphone can be represented as follows:

$$x(t) = \sum_{j=1}^{J} c_j(t)$$

where J represents the number of sound sources captured by the microphones, j represents the j-th sound source, and c; (t) represents the reception by the microphones of the j-th sound source.

In the current case where the headphone is dual-microphone, $c_j(t)=[c_1j(t), c_{2j}(t)]^T$, where $c_{1j}(t)$ represents the reception of the j-th sound source by a first microphone of the dual-microphone headphone, and $c_{2j}(t)$ represents the reception of the j-th sound source by a second microphone of the dual-microphone headphone.

In a preferred embodiment, after the process of acquiring an input signal at each time instance, the method further includes: applying a time-domain deconvolution method to perform dereverberation on the acquired input signal for each time instance.

To be more specific, before performing subsequent operations on the acquired input signal, a conventional time-domain deconvolution method is employed to eliminate reverberation from the input signal. Conventional time-domain deconvolution methods typically employ multi-channel linear prediction algorithm (MCLP) or weighted prediction error algorithm (WPE). However, in practical applications, it is not limited to the mentioned two time-domain dereverberation methods. The elimination of reverberation from the input signal can improve the accuracy of subsequent transfer function calculation and noise estimation.

As to Step 2, it involves establishing a superdirective filter model, and then filtering the input signal for each time instance based on the established superdirective filter model to generate a first reference signal for each time instance.

In a preferred embodiment, the process of establishing a superdirective filter model, and then filtering the input signal for each time instance based on the superdirective filter model to generate a first reference signal for each time instance includes: for the input signal at each time instance, generating a corresponding relative transfer function and a pseudo-coherence matrix based on the input signal, establishing the superdirective filter model based on the relative transfer function and pseudo-coherence matrix of the input signal, and filtering the input signal for each time instance based on the superdirective filter model to generate the corresponding first reference signal.

To be more specific, for the input signal at each time instance, a relative transfer function from the input signal to the microphone array is generated based on this input signal. The relative transfer function is dependent on the input signal's spatial position. The relative transfer function can be generated through the following formula:

$$a_j(n, f) = \left[1, e^{-2i\pi f \frac{d cos\theta}{c}} e^{-2i\pi f \frac{d cos\theta}{c}}\right]^T$$

where $a_j$ represents the relative transfer function from the j-th sound source to the microphone array, f represents a frequency bin, n represents the number of time frames, $a_j(n,f)$ represents the relative transfer function from the j-th sound source to the microphone array at time frame n, i is an imaginary part, d represents a microphone spacing in the microphone array, c represents the speed of sound of the input signal, and θ represents an incident angle of the speech onto the microphone array.

Figure 2:
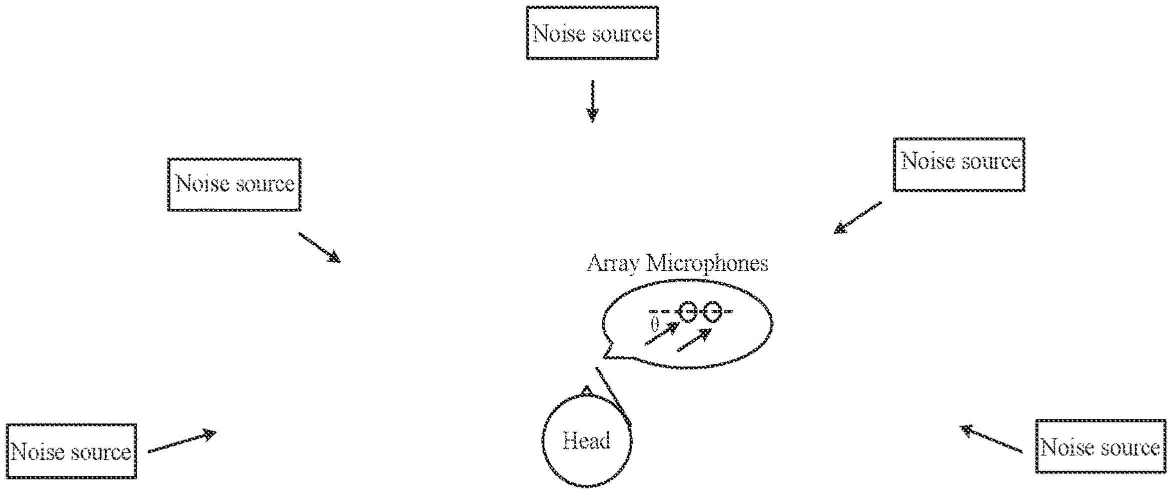
FIG. 2 is a schematic diagram illustrating a relationship between microphones and noise sources according to an embodiment of the present application.

It should be noted that the input signal contains a plurality of sound sources. The sound source can be interfering noise or target speech. As shown in FIG. 2, the present application provides a schematic diagram illustrating the relationship between microphones and noise sources. FIG. 2 takes a dual-microphone array as an example, illustrating the connection between the positions of noise sources and the microphones when the microphones are placed. In this figure, "Noise Source" represents the noise source, which includes ambient noise and surrounding interfering voices. "Array Microphones" represents the microphone array arranged at the front end of the microphones. "Head" represents the headphone with a microphone array. θ represents the incident angle of the speech onto the microphone array. This figure is just an illustrative example, and in practical applications, the number and layout of microphones are not limited to this configuration.

There exists the following relationship between the microphone input signal and the relative transfer function:

$$c_j(t) = a_j(n, f)s_j(n, f)$$

where $s_j$ represents the j-th sound source; this sound source can be target speech or interfering noise;

The corresponding pseudo-coherence matrix is generated based on the input signal, which involves taking the mean of the signal acquired through the microphone array. The pseudo-coherence matrix can be generated using the following formula:

$$\gamma = E(X, X)$$

where γ represents the pseudo-coherence matrix, X represents the signal acquired by the microphone array, and E(X,X) represents the operation of taking the mean of the acquired microphone array signal.

The superdirective filter model is established based on the obtained relative transfer function and the pseudo-coherence matrix of the input signal, which involves using the following formula to generate the corresponding superdirective filter model:

$$h = \gamma^{-1} a_T \left[a_T^H \gamma^{-1} a_T\right]^{-1}$$

where $\alpha_T$ represents the relative transfer function from the sound source in the target direction to the microphone array, H is the conjugate transpose symbol, γ represents the pseudo-coherence matrix, and h represents the generated superdirective filter model.

It should be noted that, in the implementation process, the γ in the above formula can represent the pseudo-coherence matrix or can represent a pre-assumed noise field model.

By filtering the input signals with the generated superdirective filter model as mentioned above, the corresponding first reference signal is outputted.

It should be noted that in practical usage, changes in a wearing angle of the headphone may result in variations in the incident angle of the speech to the microphone array and factors such as the sound propagation from the mouth to the headphone not meeting far-field requirements, which can lead to inaccuracies in the relative transfer functions calculated based on the geometric information, affecting the subsequent noise reduction effectiveness. In such cases, real-time estimation of the relative transfer function can be employed as a substitute for the above computation of the relative transfer function, such as frame-by-frame estimation based on a direction of arrival (DOA) of the speech, least square estimation of an inter-channel power spectral density, among others, without being limited to the mentioned methods.

As to Step 3, it involves establishing a beamforming filter model and filtering the input signal to generate a second reference signal. In a preferred embodiment, the process of establishing a beamforming filter model, and then filtering the input signal for each time instance based on the beamforming filter model to generate a second reference signal for each time instance includes: performing nullspace projection on the beamforming filter model to generate a corresponding blocking matrix; filtering the input signal for each time instance based on the blocking matrix to generate a second reference signal for each time instance.

To be more specific, based on the beamforming filter model, a constraint condition for the beamforming filter model to ensure that the target speech in an incident direction remains undistorted is solved. That is, the beamforming filter model and the relative transfer function from the sound source in the target direction to the microphone array must satisfy the following formula:

$$g_{bf}^H a_T = 1$$

where $g_{bf}$ represents the beamforming filter model, $a_T$ represents the relative transfer function from the sound source in the target direction to the microphone array, H is the conjugate transpose symbol.

In the above formula, when the relative transfer function from the sound source in the target direction to the microphone array multiplied by the beamforming filter model equals one, it indicates that the sound source that keeps in the target direction is not a distorted signal.

By performing zero-space projection on the beamforming filter model, the blocking matrix is generated. By inputting the input signal into the blocking matrix generated by the beamforming filter, the target speech in the input signal is blocked and the second reference signal containing interference noise is generated.

It should be noted that, to minimize the inclusion of the target speech in the second reference signal and avoid mistakenly eliminating the target speech, when generating the above-mentioned blocking matrix, it is necessary to ensure that the generated blocking matrix is orthogonal to the relative transfer function.

As to Step 4, it involves establishing the Kalman filter model; establishing corresponding process equation and measurement equation for each time instance based on the generated Kalman filter model; passing the error signal contained in the first reference signal and the error signal contained in the second reference signal and iterating back and forth in the Kalman filter model to minimize the error signal; generating the Kalman gain based on the error corresponding to the process equation and the error corresponding to the measurement equation mentioned above; utilizing the generated Kalman gain to eliminate the interfering noise from the first reference signal and second reference signal.

In a preferred embodiment, the process of establishing the process equation corresponding to the Kalman filter model for each time instance includes: establishing the process equation corresponding to the Kalman filter model for each time instance through the following formula:

$$w_{sc}(l) = A^H(l) w_{sc}(l-1) + \triangle w(l)$$

where $w_{sc}(l)$ represents a sidelobe cancellation filter model in the Kalman filter model at time instance l, A represents a state equation, H represents the conjugate transpose symbol, and $A^H(l)$ represents a conjugate transpose matrix of the state equation at time instance l, Δ w(l) represents the error of the process equation at time instance l.

To be more specific, the above-mentioned sidelobe cancellation filter model is a sidelobe cancellation filter model used for real-time estimation and elimination of the noise field during the Kalman adaptive iteration process of the Kalman filter model.

In another preferred embodiment, the process of establishing a measurement equation corresponding to the Kalman filter model for each time instance includes:

establishing the measurement equation corresponding to the Kalman filter model for each time instance based on the first reference signal and the second reference signal at each time instance; wherein, the measurement equation corresponding to the Kalman filter model is established for each time instance through the following formula:

$$x_{bf}(l) = x_{bm}^{H}(l)w_{sc}(l) + \triangle s(l)$$

where $x_{bf}(l)$ represents the first reference signal at time instance l, $x_{bm}^{H}(l)$ represents the conjugate transpose matrix of the second reference signal at time instance l, H represents the conjugate transpose symbol, and $\Delta s(l)$ represents the error of the measurement equation at time instance l.

In a preferred embodiment, the Kalman gain at each time instance is generated based on the error corresponding to the process equation and the error corresponding to the measurement equation at each time instance, and this process includes: generating an error covariance matrix of the process equation for each time instance based on the error corresponding to the process equation at the corresponding time instance; generating an error covariance matrix of the measurement equation for each time instance based on the error corresponding to the measurement equation at the corresponding time instance; generating a Kalman gain of the Kalman filter for each time instance based on the error covariance matrix of the process equation and the error covariance matrix of the measurement equation at each time instance.

To be more specific, both the error of the process equation and the error of the measurement equation follow a Gaussian distribution. Based on the error of the process equation, an error covariance matrix for the corresponding process equation can be obtained, and based on the error of the measurement equation, an error covariance matrix for the corresponding measurement equation can be obtained.

The Kalman gain can be calculated through the following formula:

$$K(l) \propto \frac{\varphi_{\Delta w}}{\varphi_{\Delta w} + \varphi_{\Delta s}}$$

where K(l) represents the Kalman gain at time instance l, $\varphi_{\Delta w}$ represents the error covariance matrix of the process equation, and $\varphi_{\Delta s}$ represents the error covariance matrix of the measurement equation.

In a preferred embodiment, the process, in which the Kalman filter model, based on the Kalman gain at each time instance, eliminates the interfering noise from the first reference signal and the second reference signal for each time instance includes: eliminating a noise field of the interfering noise from the first reference signal and the second reference signal for each time instance through the Kalman gain at each time instance; wherein for each time instance, the interfering noise is estimated by a process including: when the Kalman gain approximates to zero, the eliminated noise field of the interfering noise is estimated as a noise field filtered out by the sidelobe cancellation filter model in the process equation; when the Kalman gain approximates to one, the eliminated noise field of the interfering noise is estimated as a noise field estimated by the measurement equation.

To be more specific, the noise field is estimated through the following formula:

$$w_{sc}(l) = w_{sc}(l) + K(l)\left(x_{bf}(l) - x_{bm}^{H}(l)w_{sc}(l)\right)$$

where $w_{sc}(l)$ represents the sidelobe cancellation filter model in the Kalman filter model at time instance l, K(l) represents the Kalman gain at time instance l, $x_{bf}(l)$-$x_{bm}^{H}(l)w_{sc}$ (l), i.e. $\Delta s(l)$, represents the error of the measurement equation at time instance l.

In the above formula, when the error corresponding to the measurement equation is large, the Kalman gain approximates to zero. At this point, the eliminated noise field of the interfering noise approximates to the noise field estimated and filtered out by the sidelobe cancellation filter model in the process equation; when the error corresponding to the process equation is large, the Kalman gain approximates to one. At this point, the eliminated noise field of the interfering noise approximates to the noise field estimated by the measurement equation.

After real-time estimation of the noise field to be filtered out through the Kalman gain, the final error signal (i.e., the final output signal) is generated. In a preferred embodiment, the process of generating a final output signal for each time instance includes:

generating the final output signal for each time instance through the following formula:

$$e(l) = x_{bf}(l) - x_{bm}^{H}(l)w_{sc}(l)$$

where e(l) represents the final output signal at time instance l.

It should be noted that, in the process where the Kalman gain is used to estimate and filter out the noise field, a trace of the covariance matrix of the error signal (i.e., the final output signal) is minimized, thus implying the ability to estimate a more accurate noise field.

By implementing the above-mentioned embodiments of the present application, the following beneficial effects are achieved:

1. In comparison with traditional beamforming techniques, the superdirective filter model of the present application does not require starting with a high level of directivity. Instead, it enhances noise reduction through the subsequent adaptive process of the Kalman filter model. Therefore, the above-mentioned embodiments of the present application can improve noise reduction while ensuring speech fidelity without introducing adverse effects such as white noise gain.
2. The present application can narrow down the range of acquired input speech signals.
3. In the actual use of headphones, with respect to the changes in headphone wearing or noise scenario, the present application can adaptively estimate the noise field in real time, avoiding the impact of changes in headphone wearing or noise scenario on noise estimation.
4. The present application can solve the drawback of the strong dependence of the noise reduction performance on the number of microphones in the superdirective filter mode. In the embodiments of the present application, good noise reduction results can be achieved using a microphone array of just two microphones.

In addition to the above method embodiment, the present application provides an apparatus embodiment correspondingly.

Figure 3:
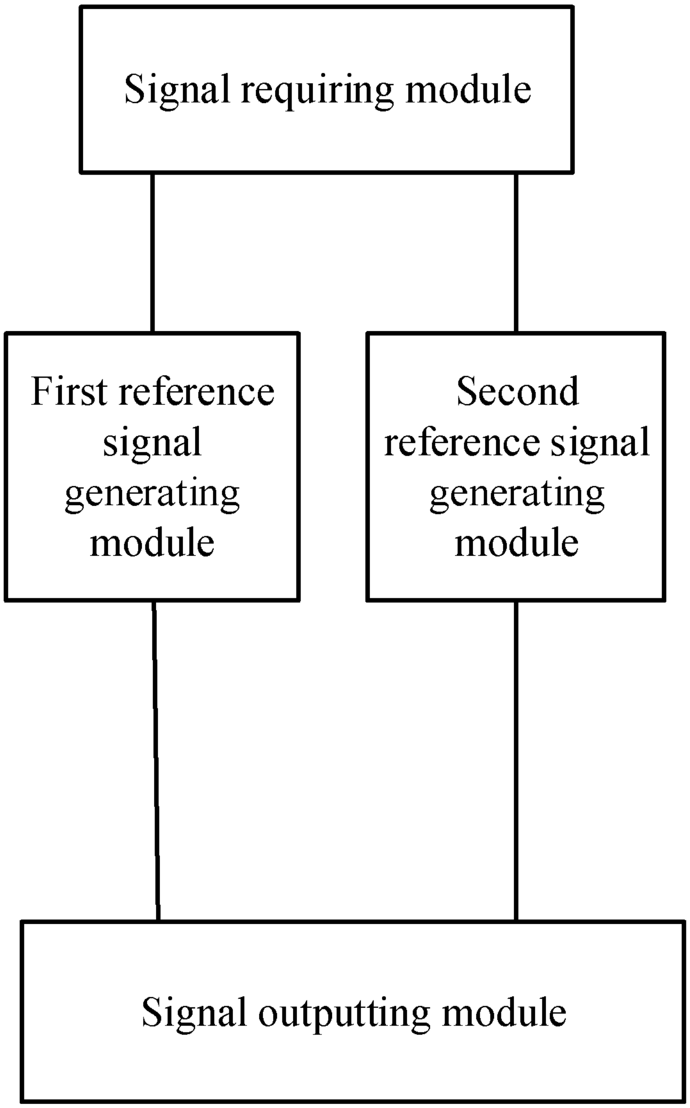
FIG. 3 is a schematic structural diagram illustrating a Kalman-filter-based adaptive microphone array noise reduction apparatus provided by an embodiment of the present application.

As shown in FIG. 3, an embodiment of the present application provides a Kalman-filter-based adaptive microphone array noise reduction apparatus, including: a signal requiring module, a first reference signal generating module, a second reference signal generating module, and a signal outputting module; wherein the signal requiring module is configured to acquire an input signal at each time instance; wherein the input signal at each time instance contains target speech and interfering noise;

the first reference signal generating module is configured to establish a superdirective filter model, and then filter the input signal for each time instance based on the superdirective filter model to generate a first reference signal for each time instance;

the second reference signal generating module is configured to establish a beamforming filter model, and then filter the input signal for each time instance based on the beamforming filter model to generate a second reference signal for each time instance;

the signal outputting module is configured to establish a Kalman filter model as well as a process equation and a measurement equation corresponding to the Kalman filter model for each time instance; generate a Kalman gain for each time instance based on an error corresponding to the process equation and an error corresponding to the measurement equation at each time instance to allow the Kalman filter model, based on the Kalman gain at each time instance, to eliminate the interfering noise from the first reference signal and the second reference signal for each time instance and to generate a final output signal for each time instance.

It should be noted that the described apparatus embodiments are illustrative. The units described as separate components may or may not be physically separated. The components shown as units may or may not be physical units, meaning they may be located in one place or distributed across multiple network units. Some or all of the modules can be selected according to actual needs to achieve the purpose of the present embodiment. Additionally, in the apparatus embodiments provided by the present application, the connection relationship between modules indicates that they have communication connections, which can be implemented as one or more communication buses or signal lines. Those skilled in the art can understand and implement the embodiments without creative effort.

Those skilled in the art can clearly understand that, for the sake of convenience and conciseness, the specific operation process of the apparatus described above can refer to the corresponding process in the aforementioned method embodiments, and will not be reiterated here.

The apparatus can be a desktop computer, laptop, handheld computer, cloud server, and other computing devices. The apparatus may include, but is not limited to, a processor and a memory.

The processor can be a central processing unit (CPU) or other general-purpose processors, digital signal processor (DSP), application specific integrated Circuit (ASIC), field-programmable gate array (FPGA), or other programmable logic devices, discrete gates or transistor logic devices, discrete hardware components. The general-purpose processor may be a microprocessor or any conventional processor. The processor serves as the control center of the apparatus, connecting various parts of the apparatus through various interfaces and circuits.

The memory is used to store the computer program, and the processor achieves various functions of the apparatus by running or executing the computer program stored in the memory and calling the data stored in the memory. The memory mainly includes a program storage area and a data storage area. The program storage area stores an operating system, an application program required for at least one a function, etc. The data storage area stores data created according to the use of the terminal device, etc. In addition, the memory may include high-speed random access memory and non-volatile memory such as a hard disk, internal memory, plug-in hard disk, Smart Media Card (SMC), Secure Digital (SD) card, flash card, at least one disk storage device, flash memory, or other volatile solid-state storage devices.

The storage medium is a computer-readable storage medium, and the computer program is stored in the computer-readable storage medium. When executed by the processor, the computer program can implement the steps of the various method embodiments described above. The computer program includes computer program codes. The computer program codes can be in the form of source codes, object codes, executable files, or some intermediate forms. The computer-readable medium may include any entity or device capable of carrying the computer program codes, such as a recording medium, USB flash drive, external hard drive, magnetic disk, optical disc, computer memory, read-only memory (ROM), random access memory (RAM), electrical carrier signals, telecommunication signals, and software distribution media. It should be noted that the content included in the computer-readable medium may be appropriately modified based on legislative and patent practice requirements in the jurisdiction. For example, in some jurisdictions, according to its legislation and patent practice, computer-readable media do not include electrical carrier signals and telecommunication signals.

The above-described embodiments are preferred embodiments of the present application. It should be pointed out that, for those skilled in the art, various improvements and modifications can be made without departing from the principles of the present application. These improvements and modifications are also considered within the scope of the present application.

The invention claimed is:

1. A Kalman-filter-based adaptive microphone array noise reduction method, wherein the method comprises:

acquiring an input signal at each time instance; wherein the input signal at each time instance contains target speech and interfering noise;

establishing a superdirective filter model, and then filtering the input signal for each time instance based on the superdirective filter model to generate a first reference signal for each time instance;

establishing a beamforming filter model, and then filtering the input signal for each time instance based on the beamforming filter model to generate a second reference signal for each time instance;

establishing a Kalman filter model as well as a process equation and a measurement equation corresponding to the Kalman filter model for each time instance; generating a Kalman gain for each time instance based on an error corresponding to the process equation and an error corresponding to the measurement equation at each time instance to allow the Kalman filter model, based on the Kalman gain at each time instance, to eliminate the interfering noise from the first reference signal and the second reference signal for each time instance and to generate a final output signal for each time instance.

2. The Kalman-filter-based adaptive microphone array noise reduction method as claimed in claim 1, wherein the process of establishing a superdirective filter model, and then filtering the input signal for each time instance based on the superdirective filter model to generate a first reference signal for each time instance comprises:

for the input signal at each time instance, generating a corresponding relative transfer function and a pseudo-coherence matrix based on the input signal, establishing the superdirective filter model based on the relative transfer function and pseudo-coherence matrix of the input signal, and filtering the input signal for each time instance based on the superdirective filter model to generate the corresponding first reference signal.

3. The Kalman-filter-based adaptive microphone array noise reduction method as claimed in claim 2, wherein the process of establishing a beamforming filter model, and then filtering the input signal for each time instance based on the beamforming filter model to generate a second reference signal for each time instance comprises:

performing nullspace projection on the beamforming filter model to generate corresponding blocking matrix;

filtering the input signal for each time instance based on the blocking matrix to generate a second reference signal for each time instance.

4. The Kalman-filter-based adaptive microphone array noise reduction method as claimed in claim 1, wherein the process of establishing a process equation corresponding to the Kalman filter model for each time instance comprises:

establishing the process equation corresponding to the Kalman filter model for each time instance through the following formula:

$$w_{sc}(l) = A^H(l)w_{sc}(l-1) + \triangle w(l)$$

where $w_{sc}$ (l) represents a sidelobe cancellation filter model in the Kalman filter model at time instance l, A represents a state equation, H represents a conjugate transpose symbol, and Δ w(l) represents the error of the process equation at time instance l.

5. The Kalman-filter-based adaptive microphone array noise reduction method as claimed in claim 4, wherein the process of establishing a measurement equation corresponding to the Kalman filter model for each time instance comprises:

establishing the measurement equation corresponding to the Kalman filter model for each time instance based on the first reference signal and the second reference signal at each time instance; wherein, the process equation corresponding to the Kalman filter model at each time instance is established through the following formula:

$$x_{bf}(l) = x_{bm}^H(l)w_{sc}(l) + \triangle s(l)$$

where $x_{bf}$(l) represents the first reference signal at time instance l, $x_{bm}{}^H$(l) represents a conjugate transpose matrix of the second reference signal at time instance l, H represents the conjugate transpose symbol, and Δs(l) represents the error of the measurement equation at time instance l.

6. The Kalman-filter-based adaptive microphone array noise reduction method as claimed in claim 5, wherein the Kalman gain at each time instance is generated based on the error corresponding to the process equation and the error corresponding to the measurement equation at each time instance, and this process comprises:

generating an error covariance matrix of the process equation for each time instance based on the error corresponding to the process equation at the corresponding time instance;

generating an error covariance matrix of the measurement equation for each time instance based on the error corresponding to the measurement equation at the corresponding time instance;

generating a Kalman gain of the Kalman filter for each time instance based on the error covariance matrix of the process equation and the error covariance matrix of the measurement equation at each time instance.

7. The Kalman-filter-based adaptive microphone array noise reduction method as claimed in claim 6, wherein the process, in which the Kalman filter model, based on the Kalman gain at each time instance, eliminates the interfering noise from the first reference signal and the second reference signal for each time instance comprises:

eliminating a noise field of the interfering noise from the first reference signal and the second reference signal for each time instance through the Kalman gain at each time instance; wherein for each time instance, the interfering noise is estimated by a process comprising:

when the Kalman gain approximates to zero, the eliminated noise field of the interfering noise is estimated as a noise field filtered out by the sidelobe cancellation filter model in the process equation;

when the Kalman gain approximates to one, the eliminated noise field of the interfering noise is estimated as a noise field estimated by the measurement equation.

8. The Kalman-filter-based adaptive microphone array noise reduction method as claimed in claim 5, wherein the process of generating a final output signal for each time instance comprises:

generating the final output signal for each time instance through the following formula:

$$e(l) = x_{bf}(l) - x_{bm}^H(l)w_{sc}(l)$$

where e(l) represents the final output signal at time instance l.

9. The Kalman-filter-based adaptive microphone array noise reduction method as claimed in claim 1, wherein after the process of acquiring an input signal at each time instance, the method further comprises:

applying a time-domain deconvolution method to perform dereverberation on the acquired input signal for each time instance.

10. A Kalman-filter-based adaptive microphone array noise reduction apparatus, wherein the apparatus comprises: a signal requiring module, a first reference signal generating module, a second reference signal generating module, and a signal outputting module; wherein the signal requiring module is configured to acquire an input signal at each time instance; wherein the input signal at each time instance contains target speech and interfering noise;

the first reference signal generating module is configured to establish a superdirective filter model, and then filter the input signal for each time instance based on the superdirective filter model to generate a first reference signal for each time instance;

the second reference signal generating module is configured to establish a beamforming filter model, and then filter the input signal for each time instance based on the beamforming filter model to generate a second reference signal for each time instance;

the signal outputting module is configured to establish a Kalman filter model as well as a process equation and a measurement equation corresponding to the Kalman filter model for each time instance; generate a Kalman gain for each time instance based on an error corresponding to the process equation and an error corresponding to the measurement equation at each time instance to allow the Kalman filter model, based on the Kalman gain at each time instance, to eliminate the interfering noise from the first reference signal and the second reference signal for each time instance and to generate a final output signal for each time instance.

* * * * *